US008798650B2

(12) United States Patent
Koraichi et al.

(10) Patent No.: US 8,798,650 B2
(45) Date of Patent: Aug. 5, 2014

(54) SENDING MESSAGES WITH USER GENERATED CONTENT VIA A MOBILE COMMUNICATION NETWORK

(75) Inventors: Najib Koraichi, Schimmert (NL); Javier Montaner, Zaragoza (ES)

(73) Assignee: Vodafone Holding GmbH, Dusseldorf (DE)

( * ) Notice: Subject to any disclaimer, the term of this patent is extended or adjusted under 35 U.S.C. 154(b) by 294 days.

(21) Appl. No.: 13/226,168

(22) Filed: Sep. 6, 2011

(65) Prior Publication Data

US 2012/0088484 A1    Apr. 12, 2012

(30) Foreign Application Priority Data

Sep. 14, 2010   (EP) ..................................... 10176564

(51) Int. Cl.
*H04W 4/00* (2009.01)
*H04W 4/14* (2009.01)
*H04W 4/12* (2009.01)
*H04B 1/38* (2006.01)
*H04M 1/725* (2006.01)
*H04W 88/02* (2009.01)

(52) U.S. Cl.
CPC . *H04W 4/14* (2013.01); *H04W 4/12* (2013.01); *H04W 4/003* (2013.01); *H04B 1/3816* (2013.01); *H04M 1/72522* (2013.01); *H04M 1/7253* (2013.01); *H04M 1/72527* (2013.01); *H04W 88/02* (2013.01)
USPC ..... 455/466; 455/418; 455/556.1; 455/556.2; 455/557; 455/558; 455/566

(58) Field of Classification Search
CPC ......... H04W 4/12; H04W 4/14; H04W 88/02; H04W 4/003; H04L 12/5895; H04M 1/72522; H04M 1/72527; H04M 1/7253; H04B 1/3816
USPC ........... 455/418, 466, 556.1, 556.2, 557, 558, 455/566
See application file for complete search history.

(56) References Cited

U.S. PATENT DOCUMENTS

| | | | | |
|---|---|---|---|---|
| 5,353,328 A | * | 10/1994 | Jokimies | 455/558 |
| 5,687,216 A | * | 11/1997 | Svensson | 455/412.2 |
| 5,920,826 A | * | 7/1999 | Metso et al. | 455/557 |
| 6,728,553 B1 | * | 4/2004 | Lehmus et al. | 455/558 |
| 6,961,754 B2 | * | 11/2005 | Christopoulos et al. | 709/204 |
| 8,260,353 B2 | * | 9/2012 | Hugot | 455/558 |
| 2008/0096590 A1 | * | 4/2008 | Celik et al. | 455/466 |
| 2010/0273513 A1 | * | 10/2010 | Hsu | 455/466 |

* cited by examiner

*Primary Examiner* — Olumide T Ajibade Akonai
(74) *Attorney, Agent, or Firm* — International IP Law Group, PLLC

(57) ABSTRACT

The subject innovation relates to an add-on device for modifying a message which is to be transmitted from a mobile communication device to a recipient via a mobile communication network. The add-on device intercepts the message sent from a smart card of the mobile communication device to a radio module of the mobile communication device. Additionally, the add-on device modifies a visible content of the message and forwards the message with the modified visible content to the radio module for transmitting the message to the mobile communication network.

16 Claims, 2 Drawing Sheets

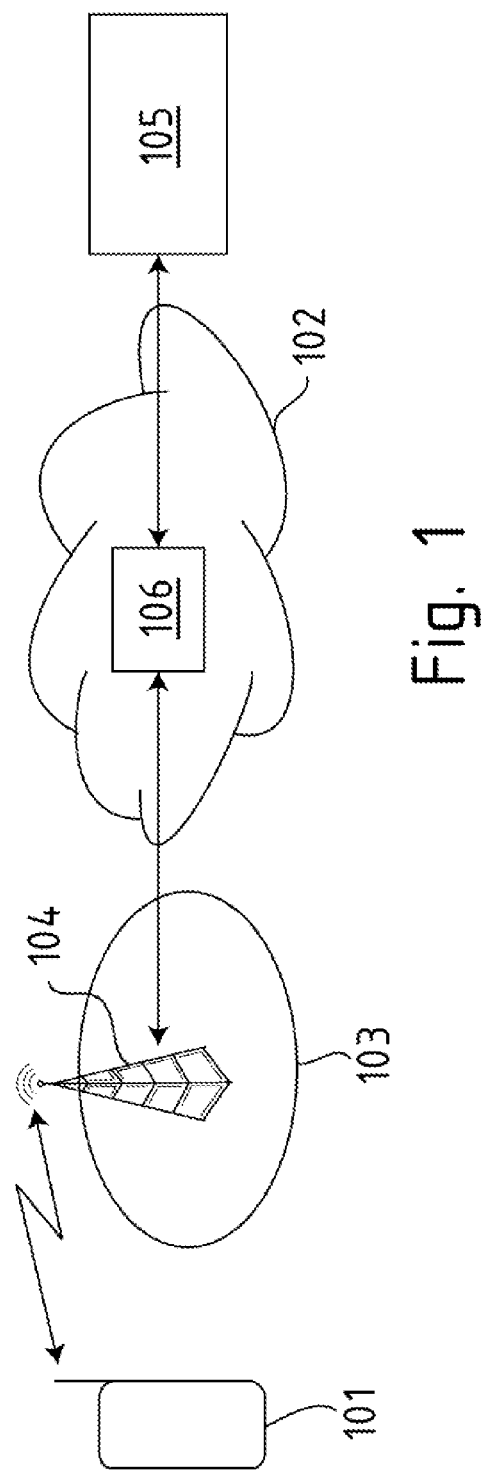

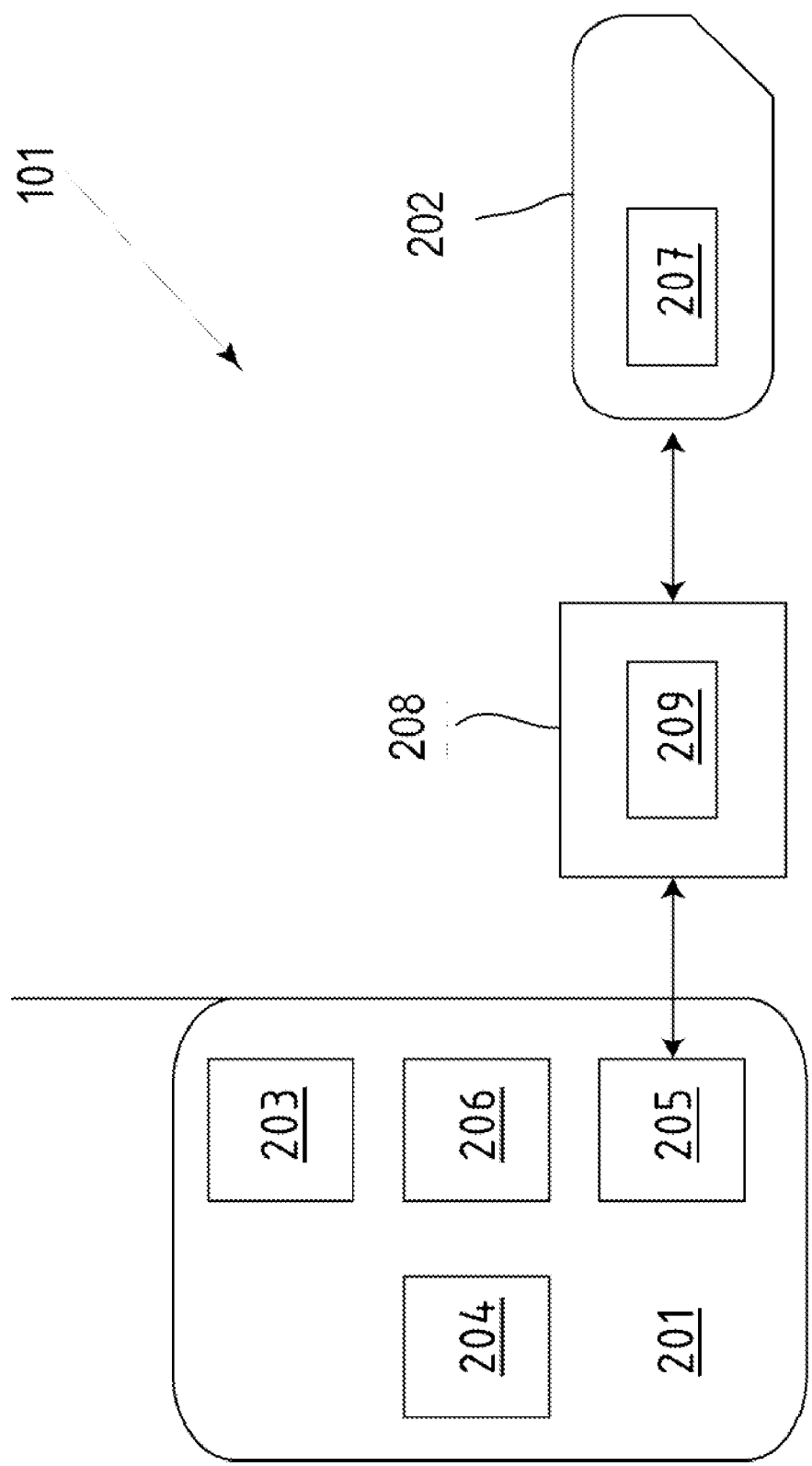

SENDING MESSAGES WITH USER GENERATED CONTENT VIA A MOBILE COMMUNICATION NETWORK

CROSS-REFERENCE TO RELATED APPLICATION

This application claims priority to European (EP) Patent Application No. 10 176 564.2-2414, filed on Sep. 14, 2010, the contents of which are incorporated by reference as if set forth in their entirety herein.

BACKGROUND

Among the most popular services in modern mobile communication systems, are messaging services which allow mobile users to send messages with different content to communication partners using their mobile communication devices. One such messaging service is the SMS which allows transmitting text messages through the mobile communication system to a recipient. A further messaging service is the MMS (Multimedia Messaging Service) which does not only allow the transmission of text messages but makes possible to include in the messages multimedia content, such as pictures as well as audio and/or video information.

The messaging services provided in mobile communication systems, particularly the SMS, have been proven to be uncomplicated way of communication for many users of mobile communications systems. However, some users regard the generation of the message and the editing of the text to be included therein to be difficult and cumbersome. To this also the fact makes a contribution that the keyboards of mobile communication device are often relatively small so that a user regards the text input as uncomfortable. This may lead to a reduced use of messaging service by the users of mobile communication systems.

In order to facilitate the generation of messages, a mobile communication device may provide various predefined messages for selection by the user. In particular, there may be predefined messages providing frequently used content, such as, for example, a request to the communication partner to call the sender of the message back or to suggest a time for a meeting with the sender of the message. A mobile communication device including similar functionality for sending predefined messages is particularly described in the international patent application WO 98/54846.

Furthermore, a mobile network operator may further improve the attractiveness of messaging services of his mobile communication system by offering special conditions for sending predefined messages to its subscribers. The mobile network operator may even wish to offer the transmission of such messages free of charge. For apply the special conditions to the transmission of the predefined message, the messages may be sent via a special routing server of the mobile communication system and/or may contain information which indicates that the message is to be transmitted under special conditions.

Like other services provided by the mobile network operator, the function for generating and sending the predefined messages may be implemented in a subscriber identity module card or in another user identification card that is inserted into the mobile communication device of the user and issued by the mobile network operator. In order to restrict the special conditions for the transmission of messages to the messages having the predefined content, the address of the special routing server or the other information included in the message may be stored in the user identification card in a secure way.

Within a message, the address or information may be incorporated into a so-called header, which is usually not displayed when the message is presented to the user or to the receiver.

In the user identification card, a predefined message may be generated and sent automatically upon a selection of the message by the user. Here, a mobile network operator which offers the transmission of predefined messages under special conditions may restrict the possibility to modify the content of the predefined message for the user. In particular, the user may not be enabled to modify a predefined message before it is sent to the receiver or he may only be enabled to add text at predetermined positions. However, the user may wish to individualize the message for the receiver and/or the present situation beyond that.

SUMMARY

The subject innovation relates to the transmission of a message from a mobile communication device to a recipient via a mobile communication network. More specifically, the subject innovation is related to a device and a method for sending a message from a mobile communication device via a mobile communication network. The message may be a short message, which may particularly be transmitted using the Short Message Service (SMS).

The subject innovation may allow the user of a mobile communication device to modify the content of a message that has been generated automatically in a mobile communication device, particular in a user identification card of the mobile communication device.

According to one aspect, an exemplary add-on device is suggested for modifying a message which is to be transmitted from a mobile communication device to a recipient via a mobile communication network. The add-on device is adapted to intercept the message sent from a smart card of the mobile communication device to a radio module of the mobile communication device, to modify a visible content of the message and to forward the message with the modified visible content to the radio module for transmitting the message to the mobile communication network.

According to a second aspect, an exemplary method for sending a message from a mobile communication device to a recipient via a mobile communication network is provided. The method comprises the steps of:
 the smart card of the mobile communication device generating the message,
 the smart card sending the message to a radio module of the mobile communication device for transmitting the message to the mobile communication network,
 an add-on module intercepting the message and modifying a visible content of the message and
 the add-on module forwarding the message with the modified visible content to the radio module such that it is transmitted to the mobile communication network.

An add-on device may be used for intercepting a message generated in the smart card of the mobile communication device in order to modify its visible content. Thereby, predetermined visible content of the message, which is included therein by the smart card, can be replaced by further content, preferably by user-generated content, in the add-on device. This allows the modification of automatically generated messages by the user.

The visible content which is modified by the add-on device particularly includes user data of the message which is displayed to the recipient at a recipient device which receives the message. The visible content may include text information. In addition or as an alternative, the visible content may include multimedia data, such as pictures, audio data and video data.

In one embodiment of the add-on device and the method, the add-on device is connectable between a smart card and a mobile terminal of the mobile communication device, the mobile terminal including the radio module. Thereby, the add-on device can be connected to the already existing interface between the mobile terminal and the smart card so that no special interface for connecting the add-on device to the mobile communication device is necessary and the add-on device can be used in any mobile communication device.

In an exemplary embodiment of the add-on device and the method, the add-on device is adapted to receive an input from a user interface of the mobile communication device and to modify the message in response to the input, the input specifying user content, particularly user-generated text, to be inserted into the message. This allows the user of the mobile communication device to specify the content which is to be inserted into the message using a user interface of the mobile communication device. The user interface may particularly be comprised in the mobile terminal of the mobile communication device. Since the add-on device receives the content from the user interface of the mobile communication device, it does not need to dispose of a further user interface for specifying the new content of the message.

Preferably, the add-on device is adapted to replace visible content included in the message by the smart card by the user content. Advantageously, this allows the user to completely determine the visible content of the message. Any predefined content that has been included in the message by the smart card can advantageously be deleted.

In an exemplary embodiment of the add-on device and the method, the add-on device is adapted to access the user interface of the mobile communication device using a card application toolkit (CAT) in order to receive the input. The card application toolkit includes a set of commands, which particularly allow a smart card to access functions and resources of the mobile terminal By using a CAT, the adapter module can access the user interface of the mobile communication device similarly to a smart card using an existing access mechanism. Thus, an existing mechanism can be implemented in the add-on device without the need to establish a new mechanism for accessing the user interface.

According to the subject innovation, an exemplary mobile communication device is provided comprising an add-on device as described herein and further including the smart card and the mobile terminal to which the smart card is connected.

In one exemplary embodiment, the smart card is adapted to include information, which leads to a transmission of the message via the mobile communication network under special conditions. The information may be an address of a special routing server of the mobile communication network which forwards the message under the special conditions or it may be other information indicating that the message is subject to special conditions. Preferably, the information leading to the transmission under the special conditions is not modified or deleted by the add-on device when replacing the visible content so that the modified message is also transmitted under the special conditions. The special conditions may include special charges for transmitting the message. In particular, the special conditions may provide for a free transmission of the message to the recipient.

As described before, the visible content may particularly be included in the user data of the message. In addition, the message may include a header which particularly includes control information used for delivering the message to the recipient. According to an exemplary embodiment, the information leading to the transmission of the message under special conditions is included in the header of the message. The header may not be displayed to the user or the recipient by default so that the information cannot be viewed by the user or a third person without further ado.

In one exemplary embodiment, the smart card is adapted to include predetermined visible content, particularly a predetermined text, into the message. This allows transmitting a message under special conditions, when the message includes predetermined visible content. Various predetermined visible content items may be stored in the mobile communication device, particularly in the smart card, and one item may be selected, when the message is sent.

In an exemplary embodiment, the smart card is adapted to generate the message in response to a request of a user of the mobile communication device, a recipient of the message being specified in connection with the request and the smart card being adapted to address the message to the recipient. The recipient of the message is likewise not modified by the add-on module, when it intercepts the message for modification.

In an exemplary embodiment, the add-on device is adapted to instruct the smart card to generate a message and/or to specify to the smart card a recipient of the message. It is an advantage of this embodiment that the user does not have to request from the smart card the generation and sending of a message having a predefined content, when he wishes to send a message with a content that is modified by the add-on device. Instead of the user, it is the add-on device which can request the smart card to generate and send the message.

In one exemplary embodiment, the smart card is adapted to use at least one card application toolkit command for passing the message to the radio module for transmission via the mobile communication network. Similar to the implementation of the card application toolkit in the add-on module, its implementation in the smart card allows for using an existing mechanism to access the mobile terminal, particularly the radio module, for sending the message. The add-on device may use a similar command to instruct the mobile communication device to send the message after it has been modified in the add-on device.

Furthermore, in one exemplary embodiment, the smart card is configured as a user identification card for providing identification and/or authentication in the mobile communication network, the smart card particularly being a subscriber identification module and/or including a universal subscriber identification module. Such smart cards are usually used in connection with mobile communication devices for identifying and/or authentication the user or his mobile communication device to the mobile communication network. Usually such smart cards are issued by the operator of the mobile communication network which may implement the functionality for generating and sending predefined messages.

BRIEF DESCRIPTION OF THE DRAWINGS

The aforementioned and other aspects of the subject innovation will be apparent from and elucidated with reference to the exemplary embodiments described hereinafter making reference to the accompanying drawings.

FIG. 1 is a block diagram of a mobile communication device connected to a mobile communication network through which messages can be sent; and FIG. 2 is a block diagram of the mobile communication device.

DETAILED DESCRIPTION OF SPECIFIC EMBODIMENTS

FIG. 1 schematically shows a mobile communication device 101 which can be connected wirelessly to a mobile communication network 102. The mobile communication device 101 may access the mobile communication network 102 through an access network 103 that may comprise a plurality of radio cells which are not depicted in FIG. 1. To each cell, an access point 104 is assigned, one of which is shown in FIG. 1 by way of example. Via the access point 104, the mobile communication device 101 accesses with the mobile communication network 102, i.e. it communicates with the network nodes of the mobile communication network 102.

The mobile communication network 102 provides a messaging service for sending messages from the mobile communication device 101 to a recipient device 105. The recipient device 105 may be another mobile communication device 101 connected to the mobile communication network 102, or it may be another communication device, which is connected to the mobile communication network 102 through or further networks, which are not shown in FIG. 1. One example of such recipient device 105 is a computer device which is connected to the mobile communication network 102 via the Internet. Within the mobile communication network 102, at least one routing server 106 is assigned to the messaging service. The routing server receives messages sent via the service from the sender and forwards the messages to the recipient. In particular, the routing server 106 receives messages sent from the mobile communication device 101 and forwards the messages to the recipient device 105. The routing server 106 may also be responsible for billing users of the mobile communication network 102 for the transmission of messages using the messaging service.

Although only one routing server 106 is depicted in FIG. 1, the mobile communication network 102 may comprise various routing servers 106, which also may have different capabilities or configurations, as will be described below. To each routing server 106 in the mobile communication network 102, an address may be assigned which is included in a message sent using the messaging service and which is used for routing the message to the routing server 106, after it has been received in the mobile communication network 102. In exemplary embodiments, the addresses may have the format of Mobile Subscriber Integrated Services Digital Network Numbers (MSISDNs) or IP addresses depending on the form of the messaging service.

The mobile communication network 102 may be configured as a GSM or UMTS network (GSM: Global System for Mobile Communications; UMTS: Universal Telecommunications System). In such mobile communication network 102, the messaging service may be an SMS providing for a transmission of text messages through a signaling channel of a circuit switched domain of the mobile communication network 102, or the messaging service may be an MMS providing for a transmission of messages that can also include multimedia data, such as pictures, audio files and video data, in a packet switched domain of the mobile communication network 102. In case the messaging service is configured as SMS, the routing server 106 is a Short Message Service Centre (SMSC), and if the messaging service is configured as MMS, the routing server 106 is a Multimedia Message Service Centre (MMSC).

The mobile communication device 101, which is schematically depicted in FIG. 2 in more detail, comprises a mobile terminal 201 and a user identification card 202. For connecting to the mobile communication network 102, the mobile terminal 201 includes a radio module 203, which is capable of establishing a radio connection to one access point 104 of the access network 103 of the mobile communication network 102. Moreover, the mobile terminal 201 comprises a user interface 204 which allows its user to interact with the mobile communication device 101. The user interface 204 may include a display unit and an input unit, which may be configured as a keypad, for example. In order to receive acoustic inputs and provide acoustic outputs to the user, the mobile terminal 201 or its user interfaces 204 may include a microphone and a loudspeaker. For connecting the user identification cards 202 to the mobile terminal 201, the mobile terminal 201 may include a card reader 205. The operation of the mobile terminal 201 may be controlled by a microprocessor 206, which has the capability of executing software applications installed in the mobile terminal 201.

The user identification card 202 is a smart card which includes a microcontroller 207 for executing program and storing data. In particular, the user identification card comprises a program for identifying and/or authenticating the mobile communication device 101 or its user to the mobile communication network 102. In addition, the user identification card 202 may control the access of the mobile communication device to the mobile communication network and may particularly determine which resources and services of the mobile communication network 102 can be used by the mobile communication device 101. The user identification card 202 may be issued by the operator of the mobile communication network 102 which may also furnish the user identification card 202 with the included software and which may personalize the user identification card 202 to the user of the mobile communication device 101. If the mobile communication network 102 is a GSM network, the user identification card 202 may be configured as a Subscriber Identity Module (SIM), and if the mobile communication network 102 is a UMTS network, the user identification card may comprise a Universal Subscriber Identity Module (USIM).

For using the messaging service, the mobile communication device 101 comprises functionalities allowing the user to generate and send a message using the messaging service. The message may particularly comprise text information, and for composing and editing the text of the message, a graphical user environment may be provided by the mobile communication device 101. In addition, further data, particularly multimedia data, may be attached to the message, if the messaging service supports the transmission of multimedia content as it is the case in the MMS. Such data to be attached to a message may also be specified by the user utilizing the graphical user environment. The graphical user environment may also allow the user to specify the recipient of the message. For this purpose, the user may enter the recipient's address using the user interface 204 of the mobile terminal 201 or the user may select the recipient or his address from an address list stored in the mobile communication device 101.

The text information composed by the user of the mobile communication forms the visible part of the message, which is included in the so-called user data of the message and which is also displayed to the recipient at the recipient device 105. The complete message, which is transmitted from the mobile communication device 101 to the routing server 106 of the mobile communication network 102, comprises header data in addition to the user data. The header data include information relevant for the transmission and delivery of the message and are usually displayed at the most partly at the mobile communication device 101 and at the recipient device 105. The information in the header data may include the address of the recipient device 105, which may have the form of an MSISDN or an IP address, and the address of a routing server 106 which shall be used for routing the message. A standard routing server 106 may be predefined in the user identification card 202 which may provide the address of the predefined routing server 106, when the user generates and sends a message.

In addition to the functionality for sending user-composed messages, the mobile communication device 101 includes a function for sending predefined messages to a recipient device 105. Each predefined message may include text which is frequently used in the communication via the messaging service. For instance, there may be predefined messages including one or more of the following text modules: a) "Call me back.", b) "Where are you?", c) "What time will I see you?", d) "How did it go?" and e) "Still awake?". When the user wishes to send one of the predefined messages, he may call a menu presenting the available predefined messages and may select the message to be sent from the menu. In addition, the user may specify the recipient of the message. This may again be done by entering the address of the recipient device 105 using the user interface 204 of the mobile terminal 201 or by selecting the recipient or his address from an address list stored in the mobile communication device 101.

Preferably, the predefined messages are sent under special conditions. In particular, there may be a special charge for sending such messages which may differ from the charge for sending user-generated messages using the messaging service. In one embodiment, the transmission of a predefined message may be free of charge. Within the mobile communication network 102 a predefined message may be recognized using information included in the header data. In one embodiment, the predefined messages may be delivered using a special routing server 106, which may be different from the standard routing server 106 controlling the delivery of user-composed messages. In this case, the header data include the address of the special routing server 106. In a further embodiment, there may be an indication in the header data, which identifies the message as being a predefined message that is subject to special conditions. When the routing server 106, which may be the standard routing server in this embodiment, evaluates the header data of the message, it recognizes the indication and initiates billing according to the special conditions provided for the transmission of the predefined messages.

The functionality for sending the predefined messages may be implemented in the user identification card 202. In one embodiment, a card application toolkit (CAT) may be used for realizing the functionality. A CAT which may be utilized for this purpose is described in the document TS 102 223 of the ETSI (European Telecommunications Standards Institute). If the user identification card 202 is configured as a SIM, the CAT may be the SIM Application Toolkit (SAT) particularly specified in the document TS 51.014 of the 3GPP (3rd Generation Partnership Project), and if the user identification card 202 comprises a USIM, the CAT may be the USIM Application Toolkit (USAT) particularly specified in the 3GPP document TS 31.111. The CAT particularly allows the user identification card 202 or applications executed therein to access functions and hardware of the mobile terminal 201 proactively.

For generating and sending predefined messages, CAT commands may particularly be used to provide the menu for selecting the predefined message at the user interface 204 of the mobile terminal 201 and to receive the user inputs for selecting the message. For selecting the recipient of the message or his address, likewise CAT functionality may be utilized. The text modules and control information for being included in the message may be stored in the user identification card 202. In particular, the information which is included in the message header in order to have the message delivered under the special conditions is stored in the user identification card 202. Preferably this information is stored therein in such a way that it cannot be accessed by the user or a third party.

When the user has selected a predefined message in the menu and has specified the recipient of the message, the user identification card 202 may generate the message including the predefined text selected by the user. Thereupon, the user identification card 202 passes the message to the mobile terminal 201 and instructs the mobile terminal 201 to transmit the message to the recipient device 105 through the mobile communication network 102. For this purpose, the user identification card 202 may again use CAT commands, such as the proactive command SEND SHORT MESSAGE, if the messaging service is configured as SMS. The information in the header data, which are required for the message to be delivered under the special conditions, may not be displayed at the mobile communication device 101, and it may also not be displayed at the recipient device 105. Thus, the information cannot be read by the user, the recipient or a third party without further ado.

In one embodiment, neither the mobile terminal 201 nor the user identification card 202 may allow the user to modify the text of the predefined messages. As an alternative, functionality may be provided for adding text or further data to the message without deleting or modifying the predefined text modules. This restriction may be implemented in the program of the user identification card 202. The message as such may not be protected against the deletion of the predefined text and/or further manipulations.

In order to eliminate the restrictions with respect to the possibility of modifying a predefined message, there is provided an add-on module 208, which allows the user to modify the content of a predefined message preferably without any restrictions.

In the embodiment schematically depicted in FIG. 2, the add-on module 208 is connected between the mobile terminal 201 and the user identification card 202. This means that the user identification card 202 is not connected directly to the mobile terminal 201 or its card reader 205, but via the add-on module 208. The add-on module 208 comprises a microcontroller 209 for executing applications and storing data. The add-on module 208 acts a so-called "man in the middle" between the mobile terminal 201 and the user identification card 202. Hence, communication signals between the mobile terminal 201 and the user identification card 202 are exchanged via the add-on module 208 that forwards data messages from the mobile terminal 201 to the user identification card 202 and vice versa.

The add-on module 208 is capable of manipulating or modifying data exchanged between the mobile terminal 201 and user identification card 202. Moreover, the add-on module 208 is capable of initiating a communication with the mobile terminal 201 and/or the user identification card 202 to interact proactively with the terminal 201 or the user identification card 202. In particular, the add-on module 208 is capable of accessing functions of the mobile terminal 201. For this purpose, the add-on module 208 may use a CAT implemented therein. Preferably, the CAT implemented in the add-on module 208 corresponds to the CAT implemented in the user identification card 202. In particular, in the add-on module 208 the SAT or USAT may be implemented, if the user identification card 202 is a SIM or includes a USIM. By implementing a CAT in the add-on module 208, the add-on module 208 is able to access the mobile terminal 201 in the same way as the user identification card 202. With the user identification card 202, the add-module 208 may communicate using CAT commands in the same as the mobile terminal 201.

For connecting the add-on module 208 between the terminal 201 and the user identification card 202, the add-on module 208 may comprise a contacting element, which can be inserted into the card reader 205 of the mobile terminal 201 and which includes electric contacts for contacting the contact elements of the card reader 205. Further electrical contacts are provided for contacting the electric contacts of the user identification card 202. The electric contact for connecting the add-on module 208 to the terminal 201 and the electric contact for connecting the add-on module 208 to the user identification card 202 are connected to the microcontroller 209 of the add-on module 208.

As one of the electric contacts of the card reader 205 of the terminal 201 usually acts as a power supply for the user identification card 202, the adapter module 208 can also be supplied with power via this electric contact. Moreover, the add-on module 208 is able to forward data received via an electric contact of the card reader 205 to the corresponding electric contact of the user identification card 202 and vice versa. The forwarded data may be modified by the microcontroller 209 of the add-on module 208, or the add-on module 208 may leave the data unmodified thereby allowing a normal communication between the mobile terminal 201 and the user identification card 202. Moreover, CAT commands of the add-on module 208 may be sent from the add-on module 208 to the mobile terminal 201 and/or to the user identification card 202 via the electric contact, which is provided for sending commands from the user identification card 202 to the terminal 201 and/or vice versa.

In one exemplary embodiment, the add-on module 208 comprises a thin contacting element, which has essentially the same shape as the user identification card 202 and which can be inserted into the card reader 205 between the electric contacts of the card reader 205 and the user identification card 202. On one surface, the contacting element comprises contact elements for contacting the contact elements of a user identification card 202, and on the opposite surface, contact elements are arranged for contacting the contacting elements of the card reader 205. The contact elements are connected to the microcontroller 209 of the add-on module 208, which may be mounted on a circuit board that is connected to the contacting element using a flexible wire. Thus, the circuit board may be placed together with the battery into the battery compartment of the mobile terminal 201, which usually also comprises the card reader 205. As an alternative, the microcontroller 209 may be included in a chip that is mounted onto the contacting element. In this embodiment, the user identification card 202 may be provided with a cutting for accepting the chip.

In another embodiment, the add-on module 208 comprises a contacting element that has essentially the same shape and thickness as the user identification card 202 and that can be inserted into the card reader 205 to contact the contact elements thereof. The contacting element is connected to a circuit board via one or more flexible wires, and the microcontroller 209 of the adapter module 208 is mounted onto the circuit board. In addition, the circuit board comprises a further card reader connected to the microcontroller 209 for receiving the user identification card 202. The circuit board may be thin enough to place it into the battery compartment of the mobile terminal 201 together with the battery.

For allowing the user to modify the predefined messages generated in the user identification card 202, the add-on module 208 may include a corresponding software application which is stored and executed in the microcontroller 209. The application may particularly be configured to intercept the predefined message, when the user identification card 202 passes the message to the mobile terminal 201 for transmitting the message to the mobile communication network 102. Then, the application of the add-on module 208 replaces the text included in the user data of the message with another text and forwards the message to the mobile terminal together with the instruction to send the message. The header of the message is preferably not modified in the add-on module 208. Thereby, it is ensured that the message is delivered under the special conditions due to the corresponding information included in the header data.

The text, which is inserted into the user data of the message instead of the text that has been included therein by the user identification card 202, may be entered by the user of the mobile communication device 101. For entering the text, the application module 208 may provide a graphical user environment, which is depicted and operated via the user interface 204 of the terminal 201. For accessing the mobile terminal 201 and its user interface 204 to provide the graphical user environment, the application may use the CAT implemented in the add-on module 208.

When the user of the mobile communication device 101 wishes to send a message using the add-on module 208, he may activate the application of the add-on module 208, at first. For activating the application, the add-on module 208 may provide a corresponding menu entry in one of the menus usually provided by the mobile terminal 201 for enabling the user to access functions of the mobile communication device 101. Upon activation of the application, the application may request the user to input the text of the message in the graphical user environment provided by the application in the user interface 204. Then the user may enter the desired text using the input unit included in the user interface 204, for example.

When the user has entered the text, the application may buffer the text in the add-on module 208 and may request the user to initiate the transmission of a predefined message from the user identification card 202. Thereupon, the user may access the menu for selecting the predefined message to be sent and may select an arbitrary predefined message (the text of which will be replaced later). In addition, the user specifies the recipient address in the same way as it is usually done when sending a predefined message or a conventional user-generated message. After the user has selected the predefined message and specified the recipient address, the user identification card 202 generates a corresponding message and passes the message to the mobile terminal 201.

The application of the add-on module 208 recognizes that a message has been passed from the user identification card 202 and it intercepts the message before it is received in the mobile terminal 201. If the application is not capable of recognizing that the message is a predefined, it may intercept the first message passed from the user identification card 202 after the user has been requested to initiate the transmission of a predefined message. After having intercepted the message, the application replaces the text included in the user data of the message by the text, which has been entered by the user of the mobile communication device 101 before. The header data of the message may not be changed by the add-on module 208. When the text has been replaced, the add-on module 208 passes the message to the mobile terminal 201. In addition, it transmits to the mobile terminal 201 a CAT command to send the message to the recipient via the mobile communication network 102. For this purpose, the add-on module 208 may forward the corresponding command which has been transmitted from the user identification card and intercepted in the adapter module 208. Alternatively, the application of the add-on module 208 may discard the command received from the user identification card 202 and generate a further command to send the message which is passed to the terminal 201 together with the message.

In an alternative embodiment, the user does not need to interact with the user identification card 202 in order to send the message. Rather, the application of the add-on module 208 is configured to initiate the generation and sending of a predefined message by the user identification card 202 and to control the selection of one predefined message as well as the specification of a recipient address. When the application of the add-on module 208 is activated by the user of the mobile communication device 101, the application requests the user to specify the recipient of the message in addition to the text of the message. When the user has entered the text and specified the recipient by entering his address or by selecting his address from the address list stored in the mobile communication device 101, the application of the add-on module 208 buffers the text and the recipient address in the add-on module 208. Moreover, the application activates the functionality for sending predefined messages of the user identification card 202. It selects a predefined message, which may be the first message provided by for selection, for example. In addition, it passes the address of the recipient of the message to the user identification card 202. Thereafter, the user identification card 202 may generate the message, and the message may be processed in the add-on module in the same way as in the embodiment described before. For selecting one predefined message and specifying the recipient address to the user identification card 202, the application of the add-on module 208 may emulate corresponding inputs made using the input unit of the user interface 204 of the mobile terminal 201.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single processor or other unit may fulfill the functions of several items recited in the claims. Any reference signs in the claims should not be construed as limiting the scope.

What is claimed is:

1. An add-on device for modifying a message which is to be transmitted from a mobile communication device to a recipient via a mobile communication network, the add-on device intercepting an automatically generated message sent from a smart card of the mobile communication device to a radio module of the mobile communication device, modifying a visible content of the message by modified visible content inputted by a user interface of a mobile terminal of the mobile communication device and forwarding the message with the modified visible content to the radio module for transmitting the message to the mobile communication network.

2. The add-on device recited in claim 1, the add-on device being connectable between the smart card and the mobile terminal of the mobile communication device, the mobile terminal including the radio module.

3. The add-on device recited in claim 2, the add-on device receiving an input from a user interface of the mobile communication device and modifying the message in response to the input, the input specifying user content, particularly user-generated text, to be inserted into the message.

4. The add-on device recited in claim 3, the add-on device accessing the user interface of the mobile communication device using a card application toolkit in order to receive the input.

5. The add-on device recited in claim 1, the add-on device replacing visible content included in the message by the smart card by the user content.

6. A mobile communication device, comprising:
a smart card;
a mobile terminal to which the smart card is connected; and
an add-on device for modifying a message which is to be transmitted from the mobile communication device to a recipient via a mobile communication network, the add-on device intercepting an automatically generated message sent from the smart card to a radio module of the mobile communication device, modifying a visible content of the message by modified visible content inputted by an user interface of the mobile terminal and forwarding the message with the modified visible content to the radio module for transmitting the message to the mobile communication network.

7. The mobile communication device recited in claim 6, wherein the smart card includes into the message an information, which leads to a transmission of the message via the mobile communication network under special conditions.

8. The mobile communication device recited in claim 7, wherein the information is included in a header of the message.

9. The mobile communication device recited in claim 6, wherein the smart card includes a predetermined visible content, particularly a predetermined text, into the message.

10. The mobile communication device recited in claim 6, wherein the smart card generates the message in response to a request of a user of the mobile communication device, a recipient of the message being specified in connection with the request and the smart card addressing the message to the recipient.

11. The mobile communication device recited in claim 6, wherein the add-on device instructs the smart card to generate the message and/or to specify to the smart card a recipient of the message.

12. The mobile communication device recited in claim 6, wherein the smart card uses at least one card application toolkit command for passing the message to the radio module for transmission via the mobile communication network.

13. The mobile communication device recited in claim 6, wherein the smart card is configured as a user identification card for providing identification and/or authentication in the mobile communication network, the smart card being a Subscriber Identification Module and/or including a Universal Subscriber Identification Module.

14. A method for sending a message from a mobile communication device to a recipient via a mobile communication network, the method comprising:
automatically generating the message with a smart card of the mobile communication device;
sending the message from the smart card to a radio module of the mobile communication device for transmitting the message to the mobile communication network;

intercepting the message and modifying a visible content of the message with an add-on module by modified visible content inputted by an user interface of a mobile terminal of the communication device, and forwarding the message via the add-on module with the modified visible content to the radio module such that the message is transmitted to the mobile communication network.

15. The add-on device recited in claim 2, wherein add-on device is adapted to be placed in a card reader unit of the mobile terminal.

16. The mobile communication device recited in claim 6, wherein the mobile terminal comprises a card reader unit and the add-on device is placed in the card reader unit.

\* \* \* \* \*